March 27, 1928. 1,664,304

C. B. McCATHRON

VEGETABLE PEELING MACHINE

Filed Jan. 26, 1927 2 Sheets-Sheet 1

Inventor
C. B. McCathron,
By A. S. Pattison & Son
Attorneys.

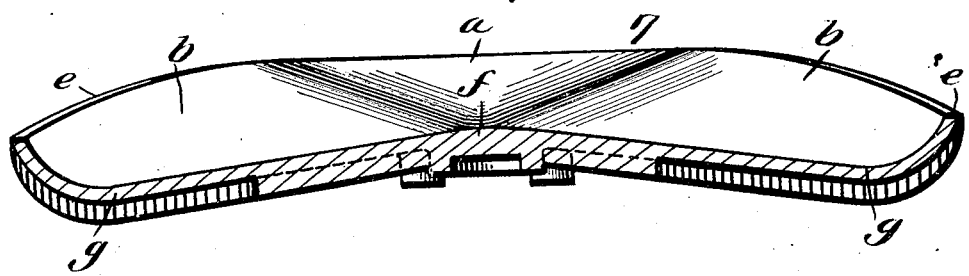
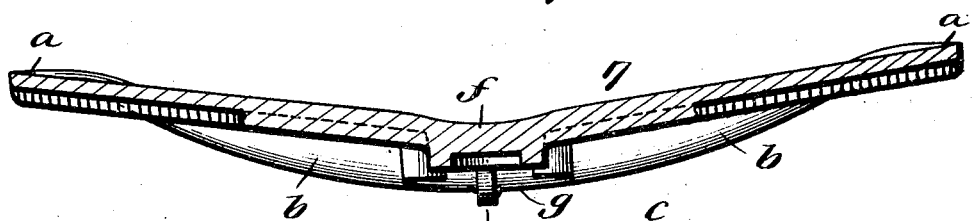
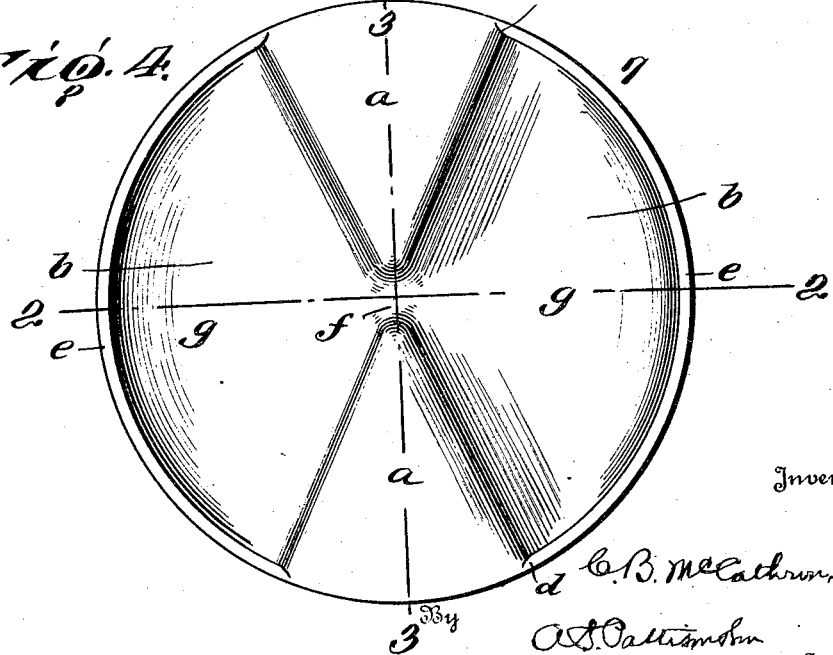

Patented Mar. 27, 1928.

1,664,304

UNITED STATES PATENT OFFICE.

CLAUDE B. McCATHRON, OF ROCHESTER, NEW YORK, ASSIGNOR TO JOSIAH ANSTICE & CO. INC., OF ROCHESTER, NEW YORK.

VEGETABLE-PEELING MACHINE.

Application filed January 26, 1927. Serial No. 163,764.

This invention relates to improvements in vegetable peeling machines, and the present improvements pertains particularly to the form of bottom or rotating disk for the container, and of the said disk with the parts that cooperate therewith.

In carrying out the present improvement the inner side of the said container is roughened and the top of the disk is also roughened, and the disk is rotated whereby the vegetables are agitated and rotated within the container and are therefore peeled.

In the peeling machines that involve broadly the construction above enumerated, I have noticed that it requires considerable time to peel the vegetables and the vegetables are not uniformly peeled, and after observing the said action and determining what I believed to be the cause of the above result, and after a series of experiments and tests, I have finally constructed an improved disk which causes the vegetables to have a certain movement within the container, and that the vegetables follow the irregular shape of the disk, whereby the said vegetables are more quickly peeled and are more accurately and evenly peeled than with any disk heretofore known to me.

Therefore the primary object of the present invention is a rotating disk or bottom for the container that is provided with oppositely projecting low surfaces that are separated by intermediate high surfaces whereby the vegetables are caused to follow the contour of this movable disk or bottom for the container, and whereby the vegetables are caused to rotate and to follow a direction that is substantially one-half of the width of the said disk, thereby providing two upward and downward movements of the vegetables that move downward substantially at the center of said container or disk and move upward substantially at the inner surface of the container.

A further object of the present invention is to provide a rotating disk or bottom for the container that is provided with oppositely projecting low surfaces and intermediate high surfaces, either the low or high surfaces being made relatively wider than the other surfaces, as I find that such construction makes an improvement in the result obtained by the peeler.

A further object of the present invention is to provide a disk or bottom for a container that is provided only with oppositely projecting low wide surfaces separated by intermediate relatively small high surfaces, whereby the vegetables are caused to follow the wide low surfaces which is not the case with disks of peeling machines heretofore known to me.

I have discovered that it is an improvement to have the low surfaces relatively wider than the high surfaces so that after the vegetables have been lifted by the relatively small high surfaces, the wide surfaces are of sufficient width to cause them to drop down and follow the contour with the result above described.

Other advantages will appear from the following description and disclosure.

Figure 2 is a vertical central sectional view on the line 2—2 of Figure 4.

Figure 3 is a transverse vertical sectional view on the line 3—3 of Figure 4.

Figure 4 is a top plan view of the improved disk.

Figure 1:
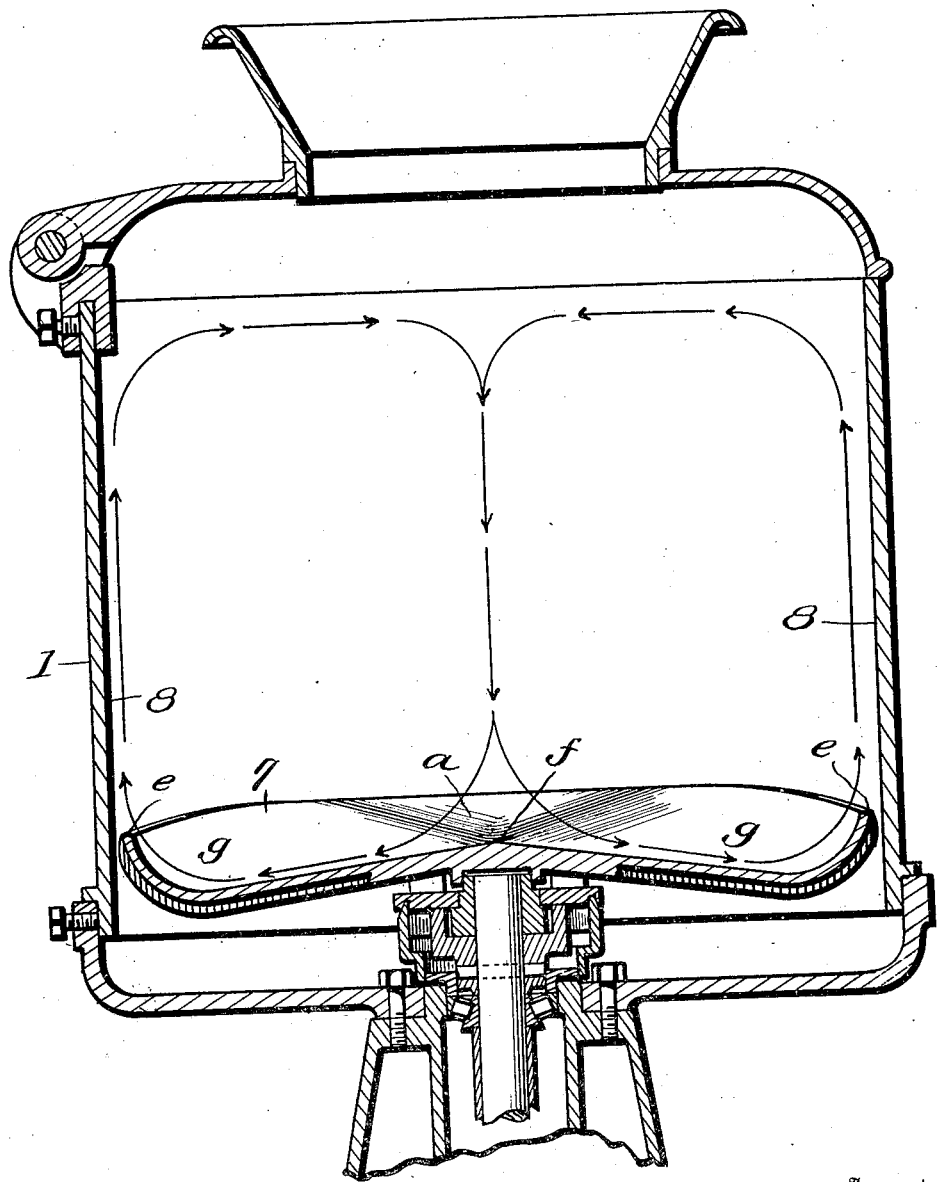
Figure 1 is a vertical central sectional view of the container of a peeling machine showing my improved disk therein, and forming a bottom therefor.

As stated herein, after watching peeling machines with disks of well known constructions, I have observed one defect to be that the machines do not thoroughly nor do they quickly peel the vegetables. I therefore proceeded to correct this defect. After studying the question somewhat, and a series of experiments and a series of tests, I discovered the form of disk herein shown which effectually and quickly peels the vegetables. The contour of this disk is such that the vegetables are caused to follow the contour of the disk which is not true of the disks heretofore constructed. I have found it to be essential that the disks should rotate at a substantially quick rotation so that the vegetables are thereby caused to rotate, and therefore the vegetables in the constructions heretofore used, I observed that they were suddenly humped upward and there was no telling, of course, whether they followed the contour of the disk. It was only after a series of tests that I discovered that the defect was that the material to be peeled was not caused to follow the outline of the top of the disk. Therefore one question was to make the disk of such form that it could rotate sufficiently rapid to give the vegetables the necessary movement and at the same time cause the vegetables to follow the shape of the top of the disk. I can utilize with the present improved disk the well known container 1 having an abrading material 8 on its inner side, the bottom of this container being formed by my improved disk 7. This I have succeeded in doing by making a disk of the contour herein shown.

This improved disk has two high places $a$ in it, the said high places being essentially V-shaped in form, and two low places $b$, the low places being located on the disk at right angles to the high places. The low places are made substantially to cover three times the amount of space covered by the high places. By this I mean from extremity $c$ to extremity $d$ is equal to about three times the distance between the outer extremities of the high parts $a$. The high places $a$ start at the center of the disk $f$ and gradually rise until it reaches the periphery of the disk which is its highest point. This center part $f$ of the high places $a$ is considerably higher than the lowest place $g$ of the low place or plane as clearly shown in sectional view Figure 14. The lower portion $b$ of the disk then comparatively suddenly is extended upward from the low place $g$ to the rim $e$ of the disk. It will be observed that this is a peculiar as well as a novel form of disk. By making a disk of this form the vegetables are not forced upwardly in such rapid succession as to prevent them from properly peeling, and that the lower portions $b$ being provided with lifts $g$, the vegetables are caused to rotate within the machine in a very peculiar manner. In dotted lines in Figure 1 I have made an effort to show the direction followed by the said vegetables. I find that the vegetables travel in a line substantially like something in a circular roll extending from substantially the center to the outer edge of the disk. The vegetables travel substantially in the line indicated by arrow, striking of course, the inner side of the container 1, and striking also the said disk as they travel in the line indicated. I find by actual test that this machine with the peculiar disk here shown has largely increased its capacity and has also largely increased the betterment of the character of its work. It is easy to observe the result of this improved disk in comparison with other forms of disks in use. The movement of the vegetables is difficult to explain and I have endeavored to explain it the best that I can. The movement is very peculiar as well as novel, but the effect of the said movement is marked as a result in the character of the work and the result of the increased efficiency of the machine.

My discovery is in a nature specific, but at the same time I do not intend to limit myself to all of the said details, and therefore the claims are to receive the broadest possible construction consistent with the state of the art.

Having thus described my invention, what I desire to claim and secure by Letters Patent is:

1. A vegetable peeling machine comprising a container having an inner abrading surface, a revolving disk having an abrading surface, the disk acting as a bottom for the container, said disk having two oppositely arranged relatively large low surfaces and intervening relatively small high surfaces, the high surfaces rising gradually towards the periphery of the disk and low surfaces falling gradually from near the center of the disk to near their periphery and suddenly rising to the periphery for the purpose specified.

2. A vegetable peeling machine comprising a container having an inner abrading surface, a revolving disk having an abrading surface, the disk acting substantially as a bottom for the container, said disk having relatively wide oppositely arranged surfaces and intermediate high surfaces of relatively small area, both the low and high surfaces beginning at substantially the center of said disk, the low surfaces falling from that point to near the periphery of the disk from which point it rises substantially abruptly and the high surfaces gradually rising from substantially said center of the disk to its periphery for the purpose described.

3. A disk for a vegetable peeling machine comprising a substantially round member having oppositely arranged relatively large low surfaces beginning substantially at the center of said disk and falling toward its periphery when it rises to said periphery and the high portions rising gradually from substantially the center of the disk to its periphery for the purpose specified.

In testimony whereof I hereunto affix my signature.

CLAUDE B. McCATHRON.